July 12, 1927.

A. LEVENSON 1,635,371

COUPLING MEMBER FOR LUBRICATING DEVICES

Filed April 1, 1925

Adolph Levenson
INVENTOR

BY Victor J. Evans
ATTORNEY

WITNESS:

Patented July 12, 1927.

1,635,371

UNITED STATES PATENT OFFICE.

ADOLPH LEVENSON, OF NEW YORK, N. Y.

COUPLING MEMBER FOR LUBRICATING DEVICES.

Application filed April 1, 1925. Serial No. 19,955.

This invention relates to improvements in lubricating devices and has especial reference to a coupling for connecting a grease gun to a grease cup of the character disclosed in my co-pending application filed of even date herewith.

An object of the present invention is to provide means for quickly and securely connecting a grease gun to a cup in a manner to permit of its ready removal.

A further object of the invention is to provide means for preventing the escape of grease from the pipe or coupling after the gun has been disconnected from the cup.

With the above and other objects in view, the invention further includes the following novel features and details of construction, to be hereinafter more fully described, illustrated in the accompanying drawings and pointed out in the appended claim.

In the drawings:—

Figure 1:
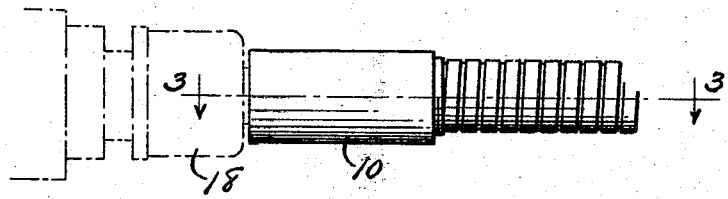
Figure 1 is an elevation illustrating a coupling attached to a grease cup, the latter being shown by dotted lines.
Figure 2:
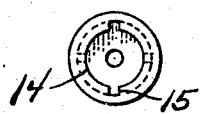
Figure 2 is an end view of the coupling.
Figure 4:
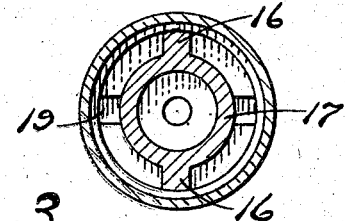
Figure 4 is a section taken on the line 4—4 of Figure 1, a portion of the grease cup being shown.
Figure 3:
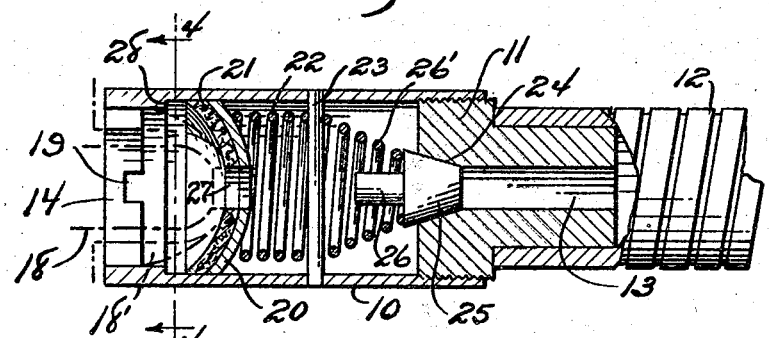
Figure 3 is an enlarged section taken substantially on the line 3—3 of Figure 1.

Referring to the drawings in detail wherein like characters of reference denote corresponding parts, the coupling is shown as including a tubular member or casing 10 which has a threaded engagement at one end with a plug 11, the latter being in turn connected to the end of a flexible tube or pipe 12 and being provided with a passage 13, whereby grease may pass from the pipe 12 into the casing 10.

The opposite or outer end of the casing is provided with an inwardly extending flange 14 which is notched at diametrically opposite points as indicated at 15. These notches permit of the passage of wings or lugs 16 which extend radially from the head 17 provided at the outer end of a grease cup 18 of the character disclosed in my before mentioned application and illustrated by dotted lines in the drawings. The head 17 is adapted to be inserted within the outer open end of the coupling so that the flange 18 will engage behind the inner ends of the wings or lugs 16 and when the coupling member is rotated in either direction, the inner ends of these wings or lugs will enter spaced notches 19 provided in the flange 14, the notches being located at substantially ninety degrees with respect to the notches 15. In order to effect this engagement, the coupling member is moved axially outward a distance equal to the depth of the notches 19.

For the purpose of preventing accidental disengagement of the wings 16 from the notches 19, the casing 10 is provided with a movable preferably concavo-convex disk 20. This disk is formed of metal and is provided with a similarly shaped yieldable or compressible lining or facing 21 which engages the adjacent rounded end of the head 17 and is yieldingly forced in such engagement by a spring 22. This spring bears against a pin 23 which extends transversely of the casing 10.

The end of the passage 13 which opens into the casing 10 is provided with a conical seat 24 which receives a valve member or plug 25; the latter being yieldingly held upon said seat by a spring 26'. This spring engages the plug 25 and surrounds a stem 26 carried by the plug, the pin 23 serving as an abutment for the spring so as to hold the plug seated.

After pressure sufficient to force grease through the pipe 12 into the cup 18 has been reduced by reverse operation of the grease gun operating means, there still remains sufficient pressure to cause a gradual outflow of grease through the end of the pipe 12. The spring 26' is sufficiently strong to overcome this pressure and keep the member 25 normally seated so that the annoyance from this cause is eliminated. The tension of the spring however is not sufficient to prevent free outlet of the grease under the operation of the gun and the disks 20 and 21 are provided with openings 27 through which the grease passes into the grease cup. The inner wall of the coupling is provided with a stop shoulder 28 which limits outward movement of the disks 20 and 21 when the coupling is detached from the cup.

Figure 5:
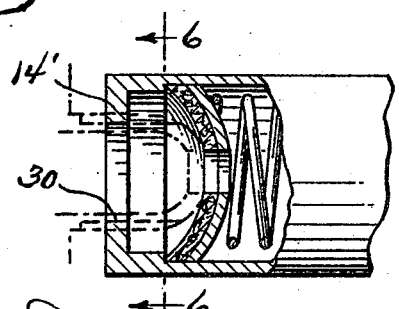
Figure 5 is a fragmentary view similar to Figure 3 but illustrating a slightly modified form of the invention.
Figure 6:
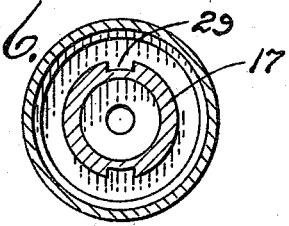
Figure 6 is a section on the line 6—6 of Figure 5.

In the form of the invention illustrated in Figures 5 and 6, the head 17' of the grease cup is provided with spaced grooves 29 for the passage of spaced lugs 30 which extend inwardly from the flange 14' at the end of the coupling. The grooves 29 are shaped as illustrated in my application before mentioned.

The invention is susceptible of various changes in its form, proportions and minor details of construction and the right is herein reserved to make such changes as properly fall within the scope of the appended claim.

Having described the invention what is claimed is:—

In a lubricating device, the combination with a grease cup having spaced radially disposed lugs, of a coupling member open at its outer end to receive said cup, a plug projecting from the other end of said member and having a longitudinal bore, a transverse pin arranged within said member, a valve, a spring interposed between the pin and valve and normally holding the latter seated to close said bore, an inwardly extending flange at the open end of the member and having spaced notches for the passage of said lugs, and notches to receive the lugs to prevent relative rotary movement between the coupling member and cup, a shoulder formed within the member above said flange, a concaved metallic plate slidably movable within said member, a packing at one side of said plate, said plate and packing having aligned central openings, a second spring arranged at the opposite side of said pin for normally holding the packing against said shoulder, said plate and packing being moved inwardly against the tension of said spring by said cup, whereby the plate holds said lugs engaged in the last mentioned notches.

In testimony whereof I affix my signature.

ADOLPH LEVENSON.